US012615113B2

(12) United States Patent
Hamada

(10) Patent No.: US 12,615,113 B2
(45) Date of Patent: Apr. 28, 2026

(54) COMMUNICATION APPARATUS, MANAGEMENT APPARATUS, CONTROL METHOD, AND STORAGE MEDIUM

(71) Applicant: Canon Kabushiki Kaisha, Tokyo (JP)

(72) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 604 days.

(21) Appl. No.: 17/984,365

(22) Filed: Nov. 10, 2022

(65) Prior Publication Data

US 2023/0155767 A1     May 18, 2023

(30) Foreign Application Priority Data

Nov. 17, 2021     (JP) ................................. 2021-187295

(51) Int. Cl.
*H04L 5/00*          (2006.01)
*H04W 28/02*       (2009.01)
*H04W 72/0453*   (2023.01)

(52) U.S. Cl.
CPC ....... *H04L 5/0048* (2013.01); *H04W 28/0226* (2013.01); *H04W 72/0453* (2013.01)

(58) Field of Classification Search
CPC ............ H04L 5/0048; H04W 28/0226; H04W 72/0453
See application file for complete search history.

(56) References Cited

U.S. PATENT DOCUMENTS

2010/0118847 A1* 5/2010 Lee ....................... H04W 48/08
                                                                    370/328

2019/0246442 A1*  8/2019 Park ...................... H04W 76/18
2019/0380128 A1* 12/2019 Park ...................... H04W 72/21
2020/0280890 A1*  9/2020 Vikberg ............ H04W 36/0016
2021/0100061 A1*  4/2021 Park ...................... H04W 76/25
2021/0136658 A1*  5/2021 Rönneke .............. H04W 48/06
2022/0174583 A1*  6/2022 Yang ..................... H04W 48/16
2022/0240330 A1*  7/2022 Xiang .............. H04W 28/0867

FOREIGN PATENT DOCUMENTS

| JP | 2003-250177 A | 9/2003 |
| JP | 2004207839 A | 7/2004 |
| WO | 2016121672 A1 | 8/2016 |

OTHER PUBLICATIONS

Japanese Office Action dated Aug. 8, 2025 in counterpart Japanese Patent Appln. No. 2021-187295.

* cited by examiner

*Primary Examiner* — Michael Thier
*Assistant Examiner* — Tracy Lauren Raimondo
(74) *Attorney, Agent, or Firm* — Venable LLP

(57)          ABSTRACT

A communication apparatus detects a signal transmitted from a first base station in another wireless communication system that is different from a wireless communication system to which the communication apparatus belongs, and transmits first information and second information to a management apparatus that manages communication in the other wireless communication system, the first information being related to the first base station, the second information indicating a radio channel to be used in a case where communication involving user data is performed with a second base station belonging to the wireless communication system when the communication apparatus has detected the signal.

24 Claims, 12 Drawing Sheets

F I G. 1
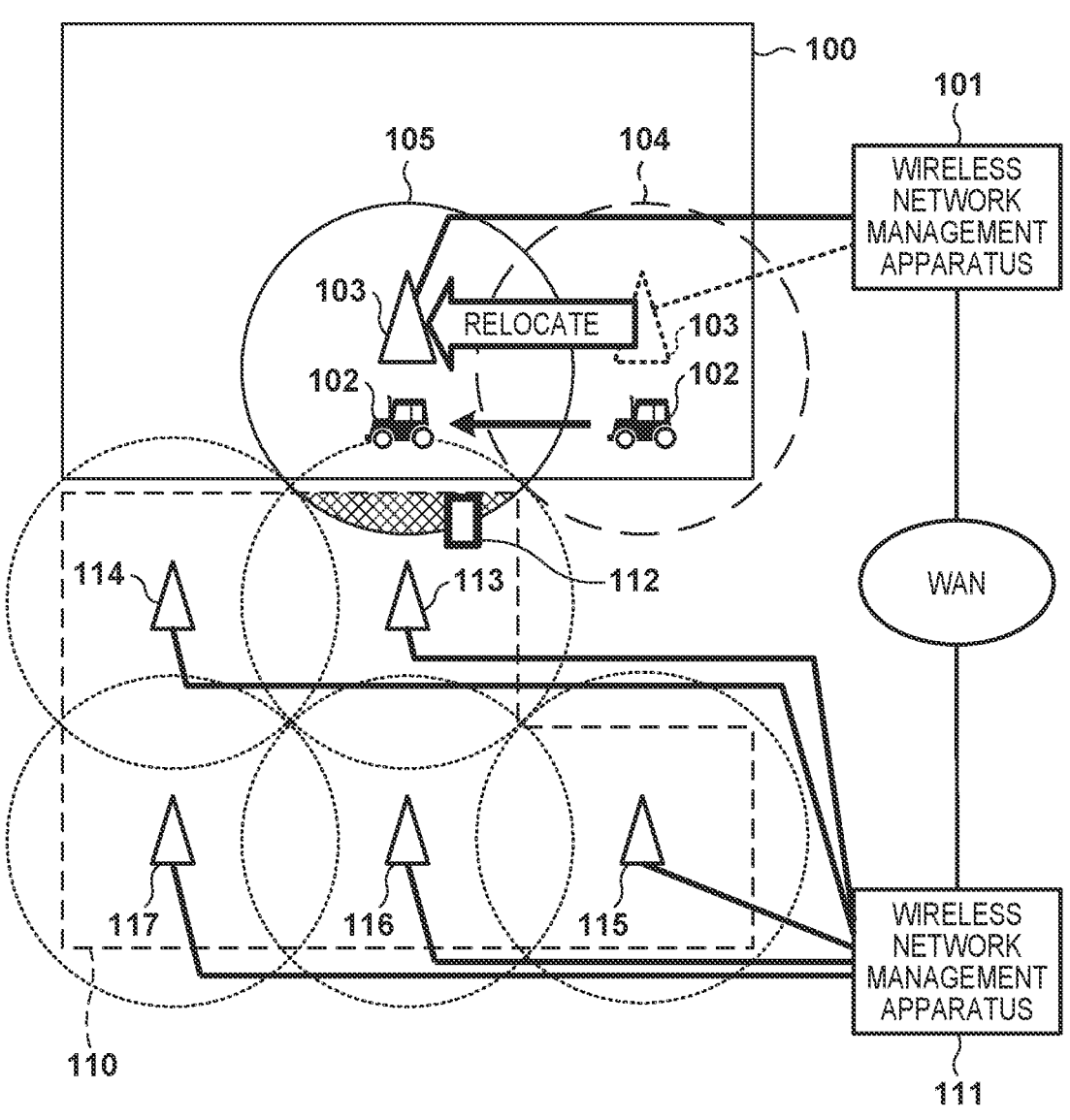

F I G. 2
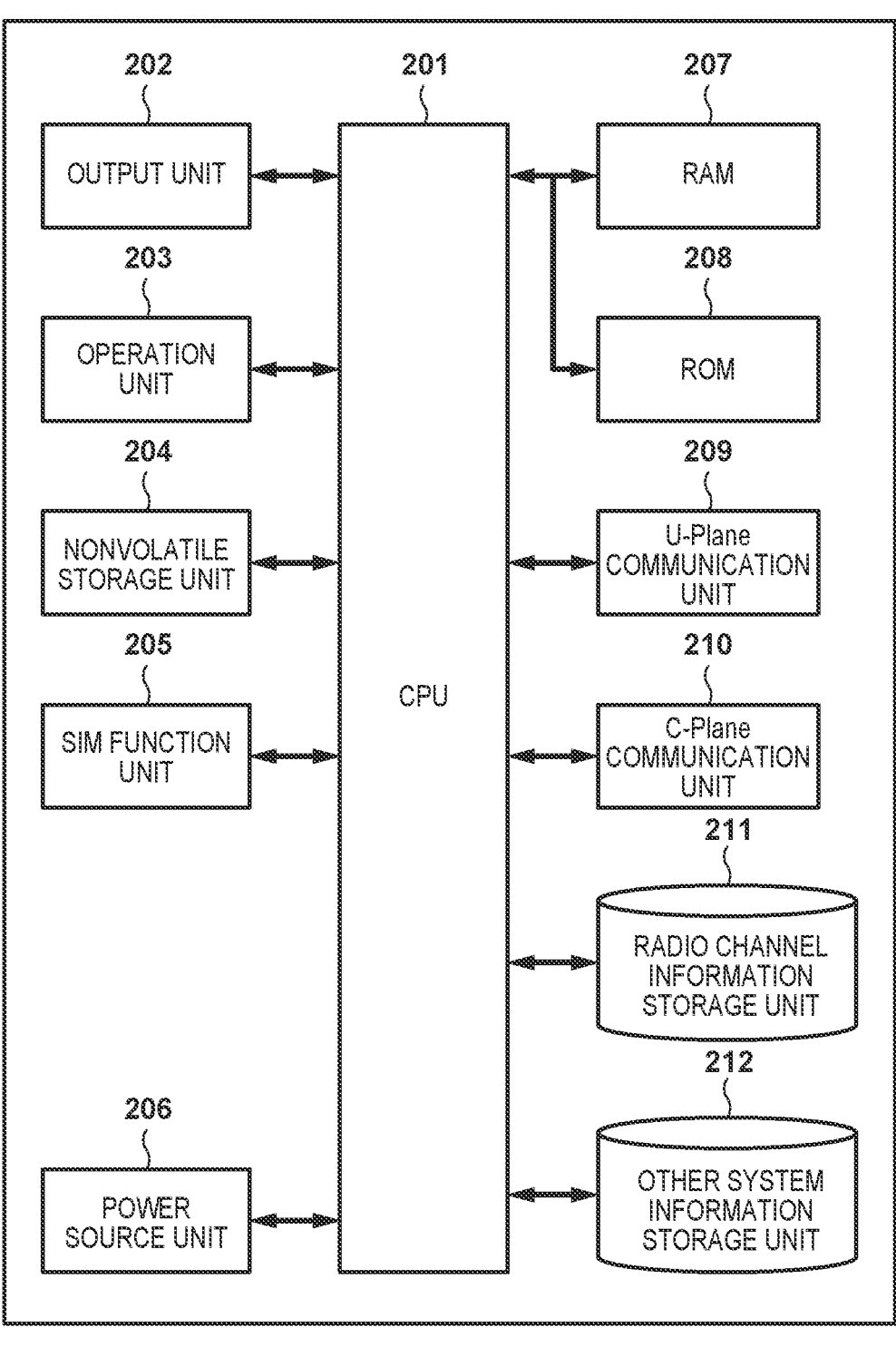

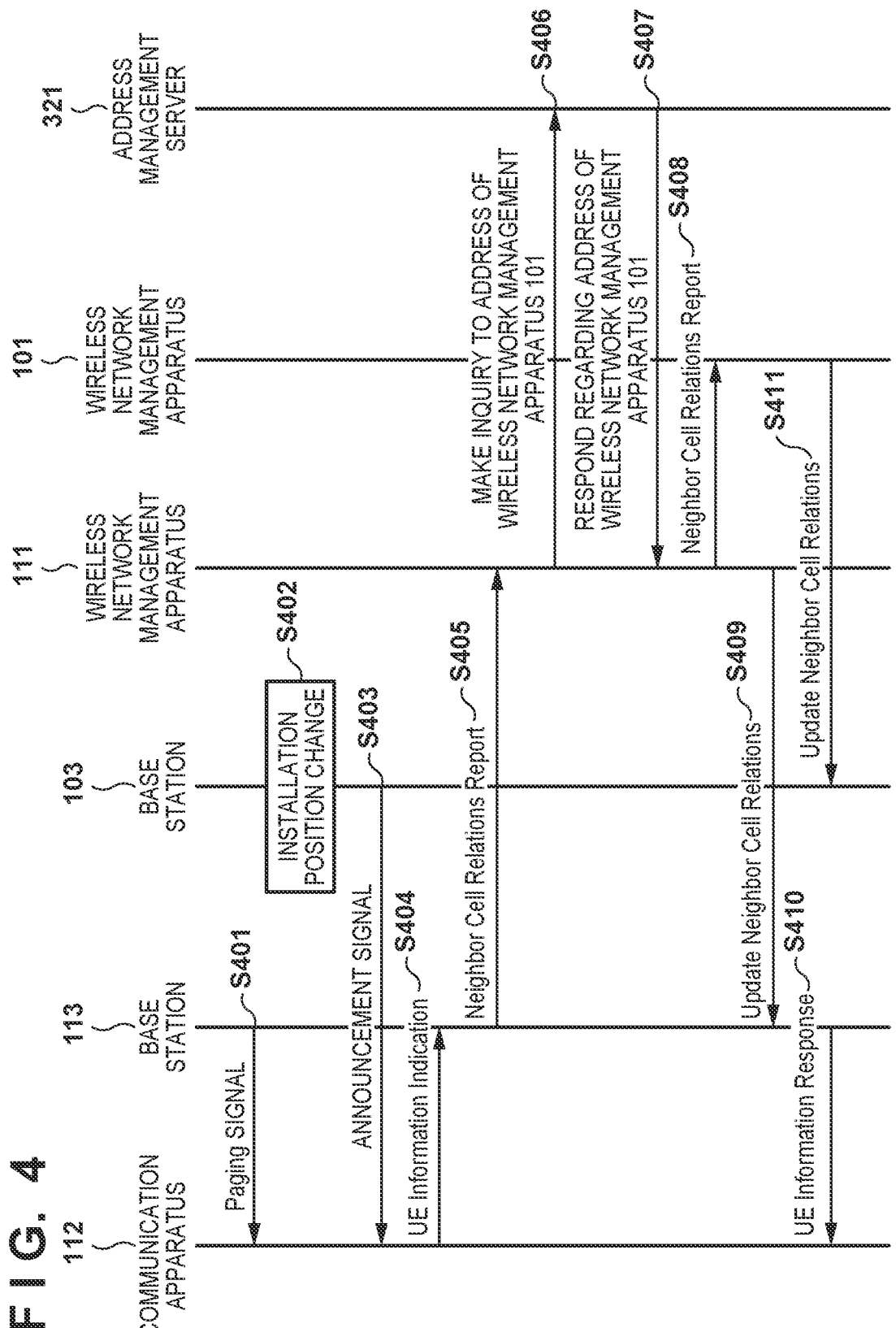
F I G. 4

F I G. 5A

| BASE STATION IDENTIFICATION INFORMATION | | INCOMING CALL TARGET 1 S-TMSI_1 (40 bit) | INFORMATION ELEMENTS FOR INCOMING CALL SETTING |
|---|---|---|---|
| PLMN-ID 24 bit | ECI (E-UTRAN Cell ID) 28 bit | | |

F I G. 5B

| BASE STATION IDENTIFICATION INFORMATION | | INFORMATION ELEMENTS OF BROADCAST NOTIFICATION TARGET |
|---|---|---|
| PLMN-ID 24 bit | ECI (E-UTRAN Cell ID) 28 bit | |

F I G. 6

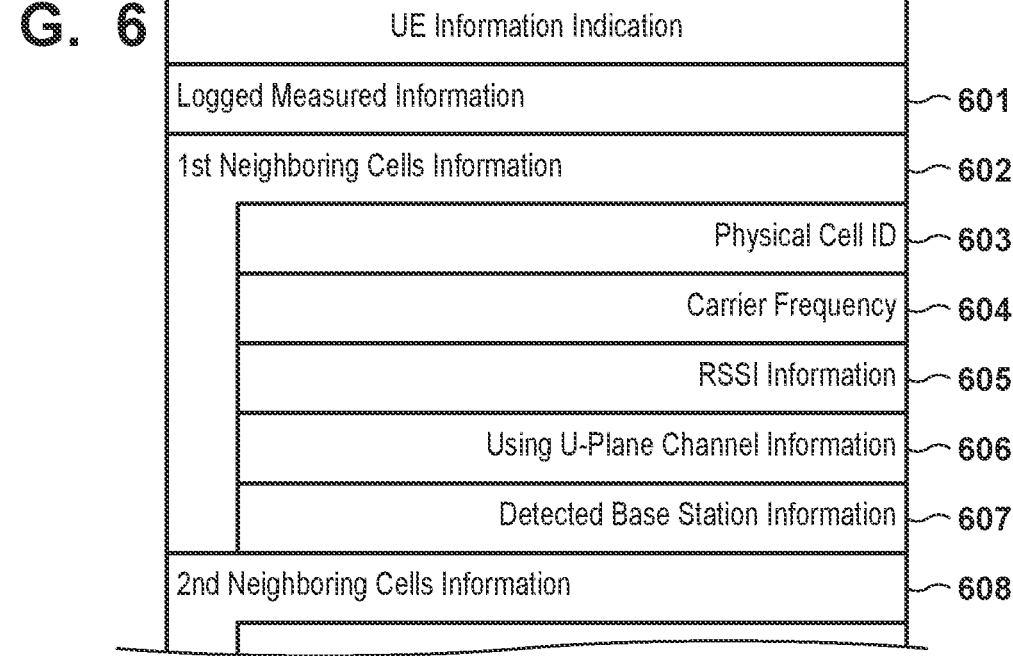

| UE Information Indication |
|---|
| Logged Measured Information — 601 |
| 1st Neighboring Cells Information — 602 |
| Physical Cell ID — 603 |
| Carrier Frequency — 604 |
| RSSI Information — 605 |
| Using U-Plane Channel Information — 606 |
| Detected Base Station Information — 607 |
| 2nd Neighboring Cells Information — 608 |

F I G. 7

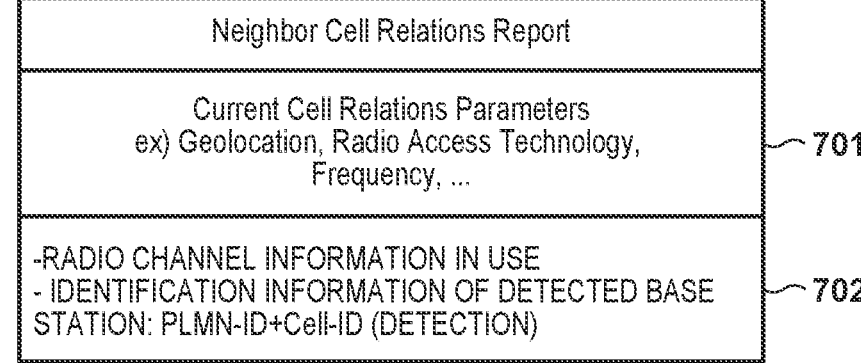

| Neighbor Cell Relations Report |
|---|
| Current Cell Relations Parameters ex) Geolocation, Radio Access Technology, Frequency, ... — 701 |
| -RADIO CHANNEL INFORMATION IN USE - IDENTIFICATION INFORMATION OF DETECTED BASE STATION: PLMN-ID+Cell-ID (DETECTION) — 702 |

F I G. 8
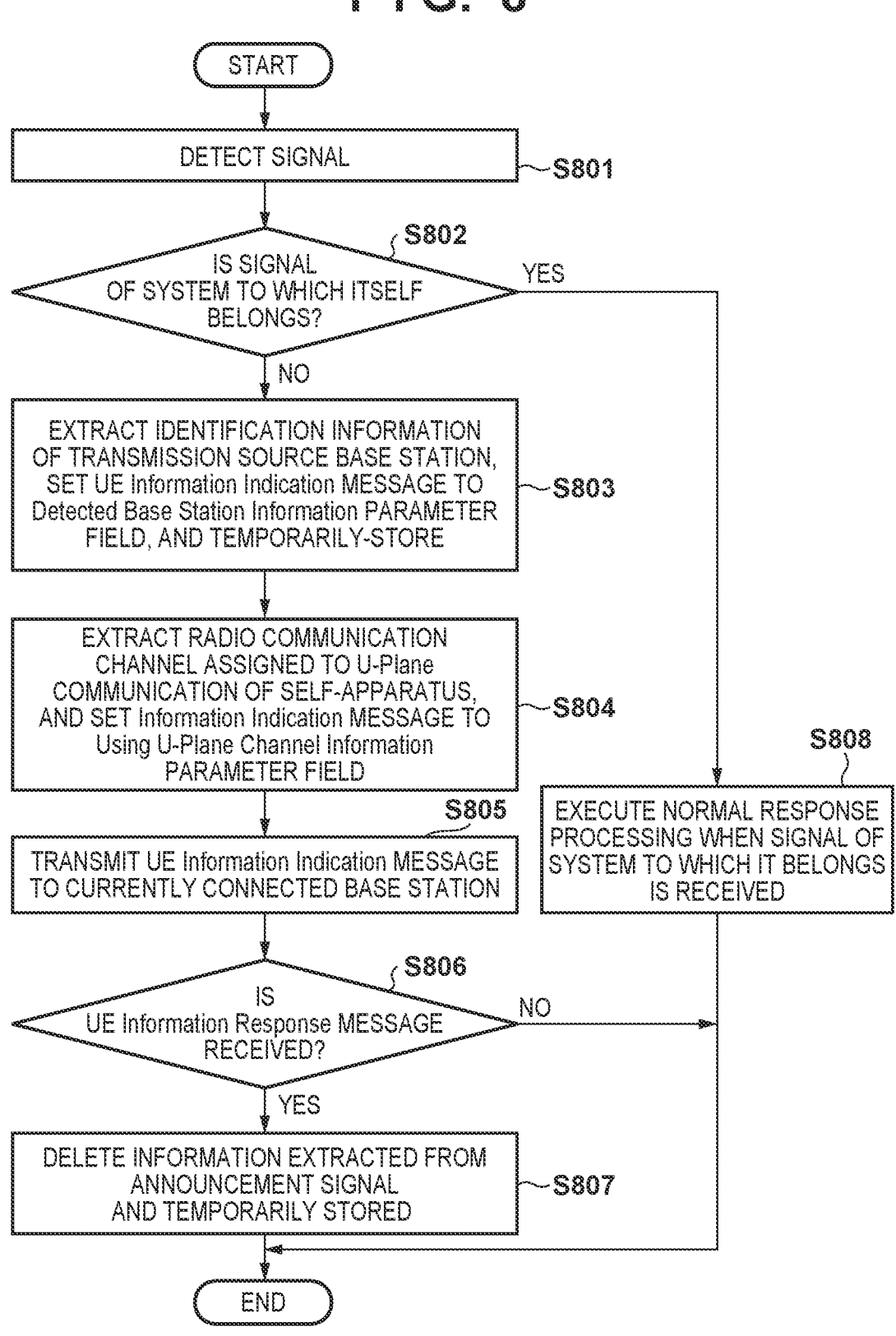

F I G. 9
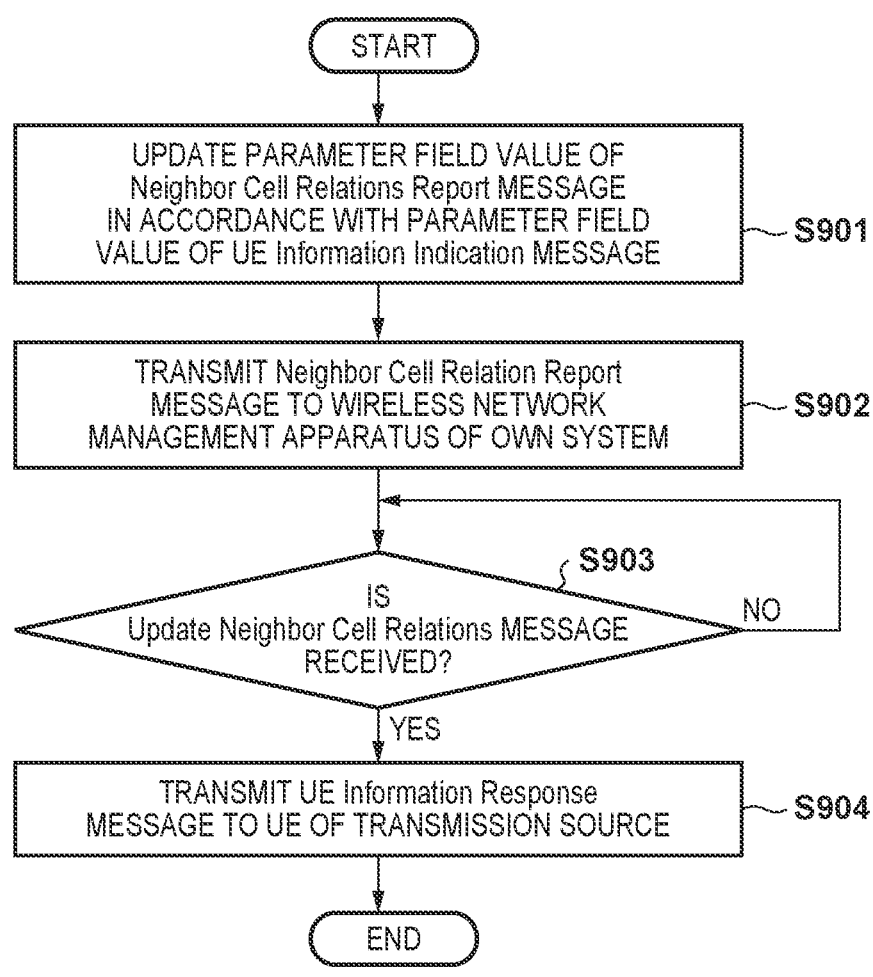

F I G.  10
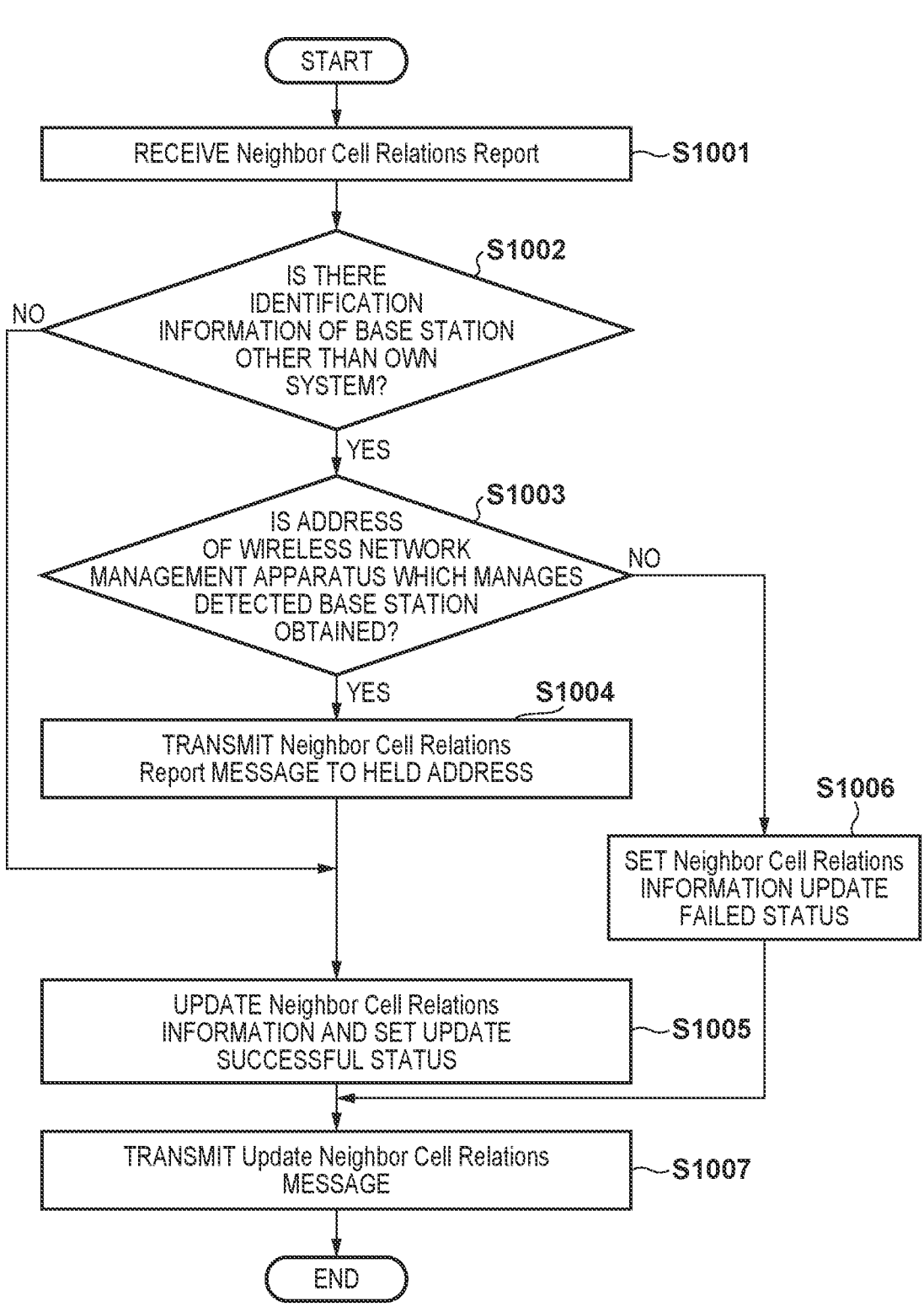

F I G. 11
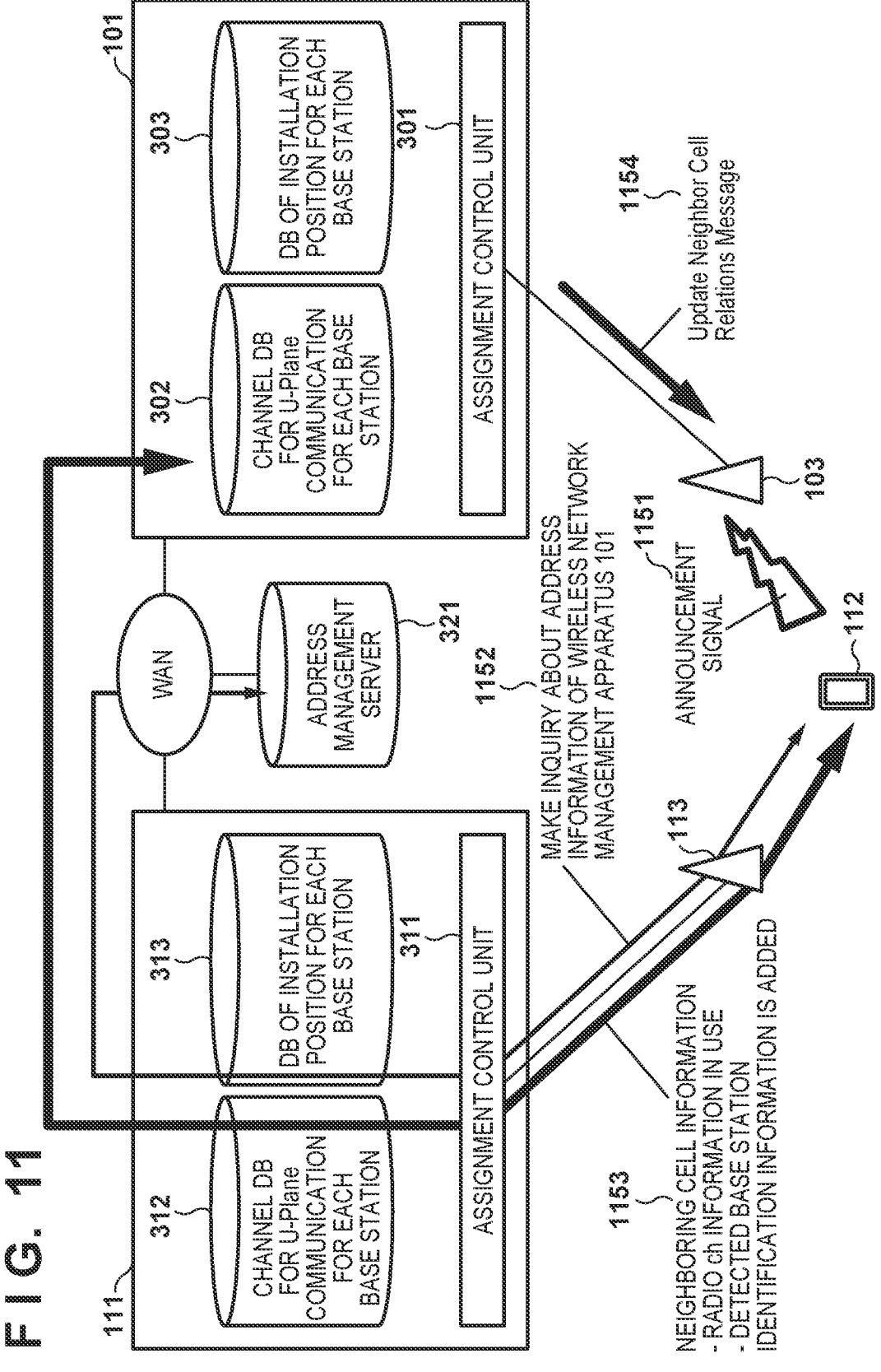

F I G. 13A

| Foreign Base Station Discovery |
|---|
| - IDENTIFICATION INFORMATION OF DETECTED BASE STATION: PLMN-ID+Cell-ID (DETECTION)<br>: |

F I G. 13B

| Foreign Base Station Discovery Response |
|---|
| - DETECTED IDENTIFICATION INFORMATION OF BASE STATION: PLMN-ID+Cell-ID (DETECTION)<br>- ADDRESS OF DESTINATION WIRELESS NETWORK MANAGEMENT APPARATUS<br>: |

F I G. 13C

| Neighbor Cell Relations Update Request |
|---|
| - RADIO CHANNEL INFORMATION IN USE<br>- IDENTIFICATION INFORMATION OF DETECTED BASE STATION: PLMN-ID+Cell-ID (DETECTION)<br>: |

F I G. 13D

| Neighbor Cell Relations Update Response |
|---|
| - RADIO CHANNEL INFORMATION IN USE<br>- IDENTIFICATION INFORMATION OF DETECTED BASE STATION: PLMN-ID+Cell-ID (DETECTION)<br>:<br>Result Code |

FIG. 14

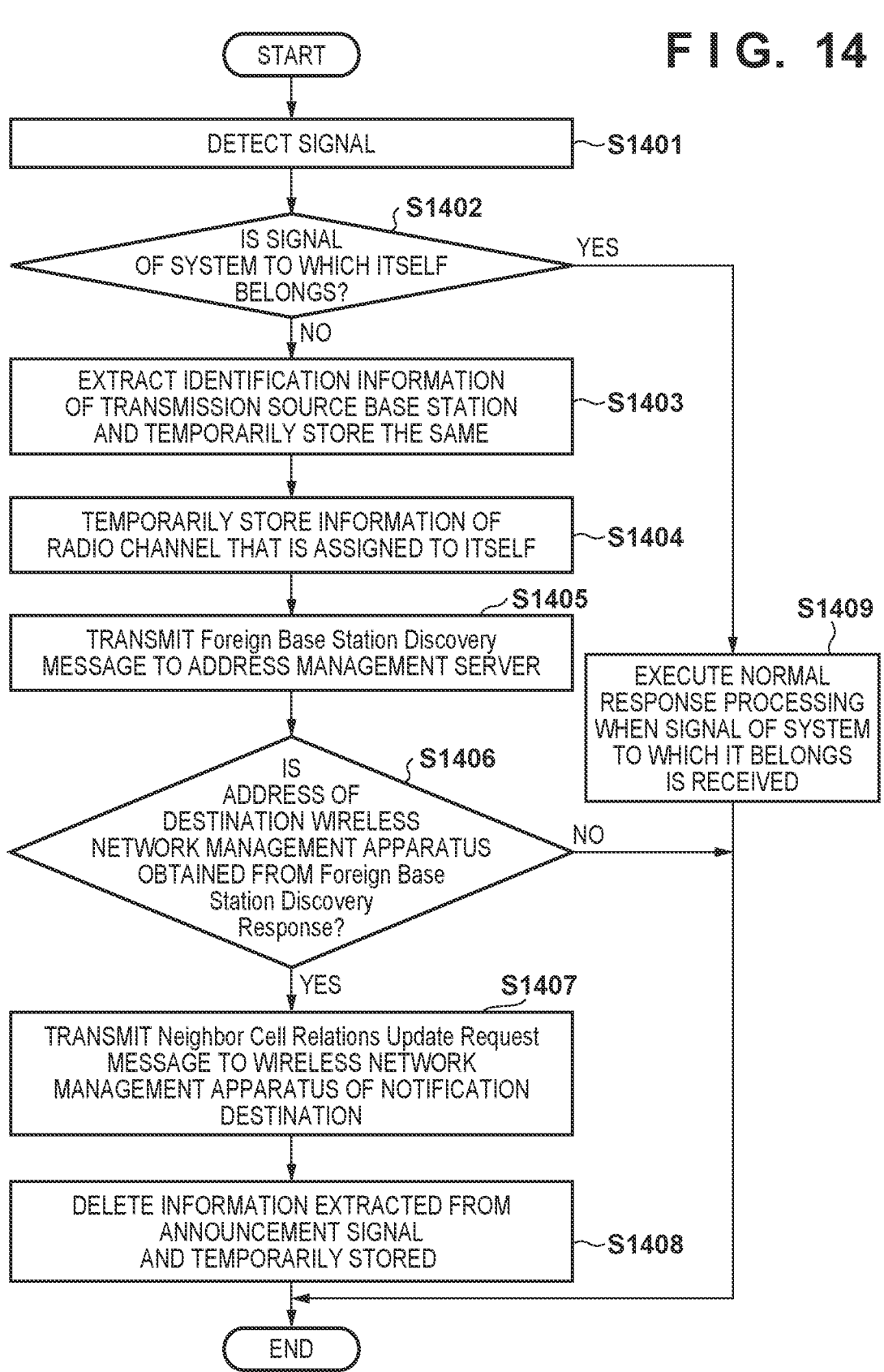

START

DETECT SIGNAL ~S1401

S1402

IS SIGNAL OF SYSTEM TO WHICH ITSELF BELONGS?

YES

NO

EXTRACT IDENTIFICATION INFORMATION OF TRANSMISSION SOURCE BASE STATION AND TEMPORARILY STORE THE SAME ~S1403

TEMPORARILY STORE INFORMATION OF RADIO CHANNEL THAT IS ASSIGNED TO ITSELF ~S1404

S1405

TRANSMIT Foreign Base Station Discovery MESSAGE TO ADDRESS MANAGEMENT SERVER

S1406

IS ADDRESS OF DESTINATION WIRELESS NETWORK MANAGEMENT APPARATUS OBTAINED FROM Foreign Base Station Discovery Response?

NO

YES

S1409

EXECUTE NORMAL RESPONSE PROCESSING WHEN SIGNAL OF SYSTEM TO WHICH IT BELONGS IS RECEIVED

S1407

TRANSMIT Neighbor Cell Relations Update Request MESSAGE TO WIRELESS NETWORK MANAGEMENT APPARATUS OF NOTIFICATION DESTINATION DELETE INFORMATION EXTRACTED FROM ANNOUNCEMENT SIGNAL AND TEMPORARILY STORED ~S1408

END

COMMUNICATION APPARATUS, MANAGEMENT APPARATUS, CONTROL METHOD, AND STORAGE MEDIUM

BACKGROUND OF THE INVENTION

Field of the Invention

The present invention relates to a technique to adjust interference among a plurality of wireless communication systems.

Description of the Related Art

Recent years have witnessed the advancement of institutionalization for allowing companies other than carriers to construct and operate cellular communication networks, such as local 5G, which uses the fifth-generation (5G) cellular communication standards, and local BWA (Broadband Wireless Access) Also, for a use case in which the location of the occurrence of communication traffic changes depending on the season, there has been consideration on relocating and operating wireless base stations in accordance with the location of the occurrence of that traffic in local 5G. In a case where a wireless base station is to be relocated, it is important to suppress inter-area interference caused by overlapping of a frequency channel used by this wireless base station and a frequency channel used by another existing wireless base station. Japanese Patent Laid-Open No. 2003-250177 describes a method in which, to suppress such interference, a control station connected to a core network performs mediation so that radio channels respectively used by a wireless base station to be moved and another wireless base station that is situated at the move destination differ from each other.

According to the invention described in Japanese Patent Laid-Open No. 2003-250177, interference can be suppressed in a case where a wireless base station is moved inside a wireless communication system developed by one network company. Meanwhile, in a wireless communication system that uses local 5G, it is expected that a system operated by a first operating agency be developed adjacent to a system operated by a second operating agency that is different from the first operating agency. The invention described in Japanese Patent Laid-Open No. 2003-250177 cannot suppress interference between such systems with different operating agencies.

SUMMARY OF THE INVENTION

The present invention provides a technique that enables control to suppress interference among a plurality of wireless communication systems.

According to one aspect of the present invention, there is provided a communication apparatus, comprising: one or more processors; and one or more memories that store computer-readable instructions for causing, when executed by the one or more processors, the communication apparatus to perform a method, wherein the method comprises: detecting a signal transmitted from a first base station in another wireless communication system that is different from a wireless communication system to which the communication apparatus belongs; and transmitting first information and second information to a management apparatus that manages communication in the other wireless communication system, the first information being related to the first base station, the second information indicating a radio channel to be used in a case where communication involving user data is performed with a second base station belonging to the wireless communication system when the communication apparatus has detected the signal.

According to another aspect of the present invention, there is provided a management apparatus, comprising: one or more processors; and one or more memories that store computer-readable instructions for causing, when executed by the one or more processors, the management apparatus to perform a method, wherein the method comprises: obtaining first information from a communication apparatus connected to a base station managed by the management apparatus in a case where the communication apparatus has detected a signal transmitted from another base station in another wireless communication system that is different from a wireless communication system to which the management apparatus belongs, the first information being related to the other base station; and transmitting the first information and second information to another management apparatus that manages communication in the other wireless communication system, the second information indicating a radio channel to be used in a case where communication involving user data is performed with the base station when the communication apparatus has detected the signal.

Further features of the present invention will become apparent from the following description of exemplary embodiments with reference to the attached drawings.

BRIEF DESCRIPTION OF THE DRAWINGS

FIG. 1 is a diagram showing exemplary configurations of wireless communication systems.

FIG. 2 is a diagram showing exemplary components of a communication apparatus.

FIG. 4 is a diagram showing an exemplary flow of processing executed in the wireless communication systems.

FIG. 5A and FIG. 5B are diagrams showing exemplary configurations of a paging signal and an announcement signal.

FIG. 6 is a diagram showing an exemplary configuration of a message at the time when a communication apparatus notifies a base station of a measurement result.

FIG. 7 is a diagram showing an exemplary configuration of a message at the time when a base station transfers a measurement result to a wireless management apparatus.

FIG. 8 is a diagram showing an exemplary flow of processing executed by a communication apparatus, FIG. 9 is a diagram showing an exemplary flow of processing executed by a base station.

FIG. 10 is a diagram showing an exemplary flow of processing executed by a wireless network management apparatus.

FIG. 11 is a diagram fix describing an overview of processing executed in the wireless communication systems.

FIG. 13A to FIG. 13D are diagrams showing exemplary configurations of messages that are transmitted/received in the wireless communication systems.

FIG. 14 is a diagram showing an exemplary flow of processing executed by a communication apparatus.

DESCRIPTION OF THE EMBODIMENTS

Figure 3:
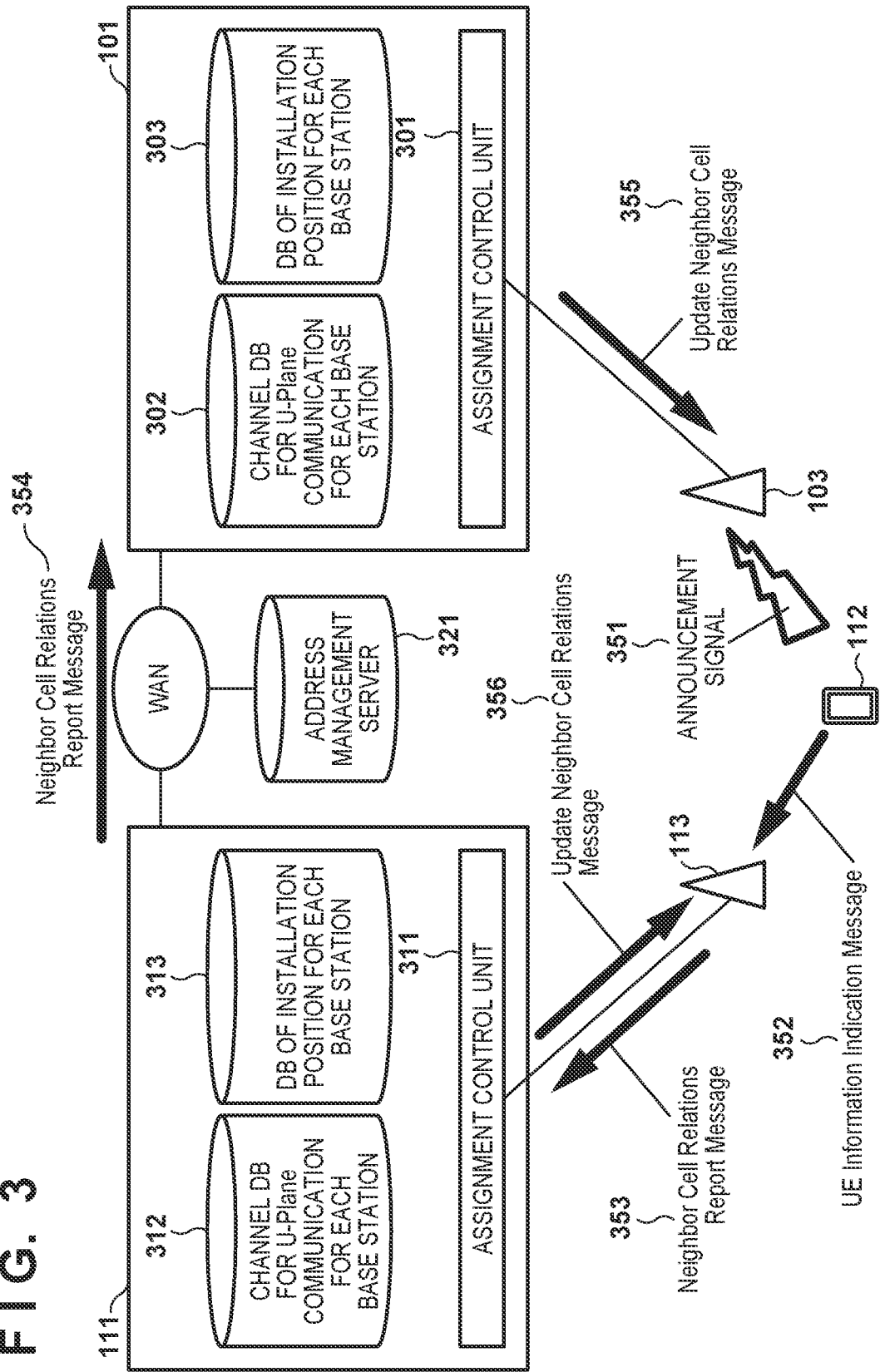
FIG. 3 is a diagram for describing an overview of processing executed in the wireless communication systems.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(System Configuration)

FIG. 1 shows exemplary configurations of wireless communication systems according to the present embodiment. It is assumed that in FIG. 1, for example, a first region 100 indicated by a solid line is owned by a first owner, whereas a second region 110 indicated by a dash line is owned by a second owner. It is also assumed that a first wireless communication system is operated so as to cover a part of the first region 100, and a second wireless communication system is operated so as to cover at least a part (in FIG. 1, all) of the second region 110. These first wireless communication system and second wireless communication system can be configured using, for example, local 5G that conforms with the fifth-generation (5G) cellular communication standards. Also, the first wireless communication system and the second wireless communication system can be an independent wireless communication network. Note that this is one example, and the systems may be configured using, for example, local BWA (Broadband Wireless Access).

The first wireless communication system includes, for example, a first wireless network management apparatus 101 that manages and controls the operations of the entire system, a base station 103 that is connected to the first wireless network management apparatus 101 to be managed and controlled, and a communication apparatus 102 that is connected to the bases station 103 to perform communication. Note, it is assumed that in the first wireless communication system, for example, a region in which a wireless communication service is provided is changed by relocating the base station 103 based on the situation concerning, for example, a schedule related to a region in which work is performed by working equipment provided with the communication apparatus 102. FIG. 1 indicates that the base station 103 provides the communication service in a cell 104 before relocation, and provides the communication service in a cell 105 after relocation. For example, after farming that uses the communication service has been completed in an area included in the cell 104 with use of farming equipment provided with the communication apparatus 102, the base station 103 is relocated and the cell 105 is formed. In this way, the farming equipment provided with the communication apparatus 102 can perform farming that uses the communication service in an area included in the cell 105, following the area included in the cell 104.

Similarly to the first wireless communication system, the second wireless communication system is configured to include a second wireless network management apparatus 111 that manages and controls the operations of the entire system. It is assumed that in the second wireless communication system, a plurality of base stations 113 to 117 are fixedly installed so as to enable wireless communication throughout the entire region owned by the second owner. These plurality of base stations 113 to 117 are each connected to the second wireless network management apparatus 111, and managed and controlled by the second wireless network management apparatus 111. A communication apparatus 112 in the second wireless communication system connects to and communicates with one of these plurality of base stations 113 to 117.

Note that the base station 103 and the base stations 113 to 117 are gNodeBs in a 5G cellular communication system, whereas the communication apparatus 102 and the communication apparatus 112 are UE (User Equipment) in a 5G cellular communication system. Note that no limitation is intended by this, and the discussion about the present embodiment is applicable to any system in which a base station and a communication apparatus (terminal) communicate with each other.

Here, in FIG. 1, the cell 104 before relocation of the base station 103 in the first wireless communication system does not intersect the second region 110. Therefore, communication by the base stations 113 to 117 in the second wireless communication system, which is intended to cover the second region 110, does not interfere with communication by the base station 103 in the first wireless communication system. On the other hand, the cell 105 after relocation of the base station 103 intersects the second region 110, which can bring about a state where communication by the base station 113 and communication by the base station 103 interfere with each other. For example, if the frequency and the temporal resource used by the base station 103 in transmission of data to the communication apparatus 102 overlap the frequency and the temporal resource used by the base station 113 in transmission of data to the communication apparatus 112, signal components in these overlapping portions interfere with each other. Such interference can cause such influences as a decrease in communication throughput in the communication apparatus 102 and the communication apparatus 112 and the like.

The present embodiment provides a method for suppressing the occurrence of such interference. Specifically, for example, in a case where the communication apparatus 112 has detected radio waves that have arrived from the base station 103, the result of this detection is shared by both of the first wireless network management apparatus 101 in the first wireless communication system and the second wireless network management apparatus 111 in the second wireless communication system. Then, the first wireless network management apparatus 101 and the second wireless network management apparatus 111 perform control so that, for example, the base station 103 and the base station 113 perform communication using different radio channels (frequency ranges and time ranges). Note that this communication may be communication of a downlink (a link of a direction from the base station to the communication apparatus), may be communication of an uplink (a link of a direction from the communication apparatus to the base station), or may be communication of both. By sharing the foregoing information, the first wireless network management apparatus 101 and the second wireless network management apparatus 111 can specify that the cell 105 formed by the base station 103 and the cell formed by the base station 11:3 are in a neighbor cell relation. Therefore, radio channels used in the cells that are in the neighbor relation are adjusted; in other cells, radio channels can be used flexibly without making such an adjustment.

(Components of Communication Apparatus)

FIG. 2 shows exemplary components of the communication apparatus 112 according to the present embodiment. The communication apparatus 112 includes, for example, a CPU 201, an output unit 202, an operation unit 203, a nonvolatile storage unit 204, a SIM function unit 205, a power source unit 206, a RAM 207, and a ROM 208.

The CPU 201 is a central processing unit for controlling the entirety of the communication apparatus 112. Nate that the CPU 201 is one example of processors; another processor, such as an MPU (microprocessor unit) and a multi-core processor, may be used, and a plurality of such processors may be used in combination as necessary. That is to say, the communication apparatus 112 can include one or more processors. Note that the communication apparatus 112 may include a processing circuit, such as an FPGA (field-programmable gate array), a DSP (digital signal processor), and an ASIC (application-specific integrated circuit), in addition to or in place of the foregoing. The output unit 202 is configured to include devices capable of outputting information, such as a displaying apparatus (e.g., a display), a speaker, and an oscillator. The output unit 202 presents, to a user, information obtained as a result of processing executed by the CPU 201 by, for example, causing the display to display a screen, causing the speaker to output sound, and causing the oscillator to oscillate. The operation unit 203 is configured to include devices capable of accepting a user operation, such as buttons, a keyboard, and a touch panel. In a case where the operation unit 203 has accepted a user operation, it outputs an electrical signal corresponding to the content of this operation to the CPU 201. Note that a device that functions as both of the output unit 202 and the operation unit 203, such as a touch panel display and the like, may be used.

The nonvolatile storage unit 204 is composed of a nonvolatile storage apparatus for storing information that is intended to be continuously held even after the power source of the communication apparatus 112 is turned OFF. The SIM function unit 205 executes the functions of a SIM (subscriber identification module) on the communication apparatus 112. For example, when a SIM card has been inserted into a SIM card slot, the SIM function unit 205 enables connection to a wireless communication network with use of information stored in this SIM card. Note that the SIM function unit 205 may be an apparatus on which a built-in SIM is mounted, and can enable connection to a wireless communication network by executing processing for, for example, registering and activating SIM information provided by an operating agency that provides this network. The power source unit 206 is, for example, a battery, and has a function of supplying power to the communication apparatus 112. The RAM 207 is a random-access memory, and can function as a working memory when, for example, the CPU 201 executes a program stored in the ROM 208. Furthermore, the RAM 207 can also be used to, for example, store temporary information, such as parameters related to communication. The ROM 208 is a read-only memory, and is configured to store, for example, a computer program that is intended to be executed by the communication apparatus 112, and instruction codes that can be executed by a computer.

Also, the communication apparatus 112 has a wireless communication function for communicating with the base stations 113 to 117. This wireless communication function is configured to include, for example, a baseband processor, an RE (radio frequency) chip, an antenna, and the like. In a cellular communication network based on Long-Term Evolution (LTE) or 5G, C-Plane communication for transmitting/receiving control data, as well as U-Plane communication for transmitting/receiving user data, is performed between a base station and a communication apparatus by way of the foregoing wireless communication function. Note that the C-Plane and the U-Plane are also referred to as a control plane and a user plane, respectively. The communication apparatus 112 includes a U-Plane communication unit 209 for U-Plane communication and a C-Plane communication unit 210 for C-Plane communication, which operate in conformity with, for example, the 5G cellular communication standards. Note that although the U-Plane communication unit 209 and the C-Plane communication unit 210 are illustrated separately in FIG. 2 for the sake of convenience, it is sufficient that C-Plane communication and U-Plane communication are logically separated from each other, and physically, the communication units can be mounted as one communication apparatus. Also, the communication apparatus 112 includes a radio channel information storage unit 211 that stores, for example, information of a radio channel for U-Plane communication, which has been assigned to the communication apparatus 112 by the second wireless network management apparatus 111. Furthermore, the communication apparatus 112 includes another system information storage unit 212 that stores identification information about base stations in another wireless communication system that is different from the wireless communication system to which the communication apparatus 112 belongs, which has been detected by analyzing radio signals that have arrived. The radio channel information storage unit 211 and the other system information storage unit 212 can be implemented using, for example, physical storage apparatuses, such as memories, HDDs (hard disk drives), and SSDs (solid-state drives). Note that the radio channel information storage unit 211 and the other system information storage unit 212 may be implemented using discrete storage apparatuses, or may be implemented using one physical storage apparatus.

Note that the components of FIG. 2 are examples, and the communication apparatus 112 can naturally include other components. For example, the communication apparatus 112 can include general components for executing functions as a terminal apparatus in a cellular communication system, and further components for executing a specific application. Furthermore, a part of the components of FIG. 2 may be omitted, and two or more function blocks may be realized as one function block.

(Flow of Processing)

Next, a description is given of an exemplary flow of processing executed in the present embodiment.

Processing Example 1

FIG. 3 is a diagram showing an overview of a flow of processing in a first processing example. As shown in FIG. 3, the first wireless network management apparatus 101 shown in FIG. 1 includes an assignment control unit 301 that assigns a radio channel to be used for U-Plane communication in a base station in the first wireless communication system. The first wireless network management apparatus 101 also includes a database 302 that stores, for each base station in the first wireless communication system, a radio channel being used for U-Plane communication, and a database 303 of the positions of installation thereof. Similarly, the second wireless network management apparatus 111 includes an assignment control unit 311, a database 312 that stores, for each base station in the second wireless communication system, a radio channel being used for U-Plane communication, and a database 313 of the positions of installation thereof. The first wireless network management apparatus 101 and the second wireless network management apparatus 111 are configured in such a manner that they can communicate with each other via a WAN (wide area network), and the addresses of these wireless network management apparatuses are held and managed by an address management server 321. Note that the address management server 321 may be, for example, a server in the network, or may be included inside each wireless network management apparatus.

In the present processing, in a case where the communication apparatus 112 has detected an announcement signal 351 from the base station 103 in the first wireless communication system that is different from the system to which the self-apparatus belongs, the first wireless network management apparatus 101 in the first wireless communication system is notified of the detection. For example, the communication apparatus 112 obtains identification information of the base station 103 from this announcement signal 351, and transmits a notification including this identification information to the base station 113 in a case where this identification information is not identification information that belongs to the second wireless communication system. This notification can be provided via, for example, a UE Information Indication message 352. Upon receiving this notification, the base station 113 provides the second wireless network management apparatus 111 with a notification indicating that the communication apparatus 112 has detected the signal of another system. This notification is provided using, for example, a Neighbor Cell Relations Report message 353. Then, the second wireless network management apparatus 111 provides a similar notification to the first wireless network management apparatus 101 in the first wireless communication system to which the base station 103, which is the transmission source of the signal detected by the communication apparatus 112, belongs. This notification is also provided using, for example, a Neighbor Cell Relations Report message 354. Then, the first wireless network management apparatus 101 sets a radio channel to be used in the base station 103 through the assignment control unit 301 based on this notification, and notifies the base station 103 of this selling. Also, the first wireless network management apparatus 101 notifies the base station 103 of the existence of the cell formed by the base station 113 in the second wireless communication system as a neighbor cell of the base station 103. This notification can be provided via an Update Neighbor Cell Relations message 355. Also, the second wireless network management apparatus 111 notifies the base station 113 of the existence of the cell formed by the base station 103 as a neighbor cell via an Update Neighbor Cell Relations message 356.

FIG. 4 shows an exemplary flow of this procedure. Initially, the communication apparatus 112 is situated in the cell formed by the base station 113; for example, in a case where it has received a paging signal (step S401), it can establish connection with the base station 113 and receive user data in a downlink. At this time, the paging signal is configured as shown in FIG. 5A; from which base station (cell) the signal has been received is indicated by a PLMN-ID and an ECI associated with that base station (cell). Note that PLMN-ID stands for Public Land Mobile Network Identifier. Also, ECI denotes a cell identifier of an Evolved Universal Terrestrial Radio Access Network (E-UTRAN Cell ID). The communication apparatus 112 can execute connection establishment processing based on the paging signal, which includes the PLMN-ID of the wireless communication system to which the transmission source of the paging signal belongs. Note that although FIG. 4 shows an exemplary case where the paging signal has been transmitted from the base station 113 as one example, various signals are transmitted from the base station 113, and the communication apparatus 112 can receive these signals.

It is assumed here that the position of installation of the base station 103 in the first wireless communication system has been changed (step S402), and a state where the cell 104 was formed has changed to a state where the cell 105 is formed, for example. In this state, an announcement signal from the base station 103 can arrive at the communication apparatus 112 (step S403). Upon detecting this announcement signal, the communication apparatus 112 analyzes the content thereof, and specifies that the announcement signal has arrived from the base station 103 in a system that is different from the second wireless communication system to which the self-apparatus belongs. Note that the announcement signal is configured as shown in FIG. 5B; based on the PLMN-ID and ECI, the communication apparatus 112 can specify that the announcement signal is a signal that has arrived from a base station in a system that is different from the second wireless communication system. Note that although the description here concerns a case where the announcement signal has arrived at the communication apparatus 112, no limitation is intended by this. For example, in case of arrival of no particular signal with which a base station acting as a source of this signal can ne specified, such as a paging signal, the communication apparatus 112 can specify whether the transmission source of this signal is the base station in the second wireless communication system to which the self-apparatus belongs. Note that the communication apparatus 112 may analyze not only a broadcast signal such as an announcement signal and a paging signal, but also a control information portion and the like of an individual signal, to specify whether the transmission source of this signal is the base station in the second wireless communication system to which the self-apparatus belongs.

Furthermore, although the foregoing has been described in relation to a case where the combination of the PLMN-ID and ECI included in a signal serves as the basis for specifying to which system the base station acting as the transmission source of this signal belongs, no limitation is intended by this. In a case where the system can be specified using only the PLMN-ID or only the ECI, it is sufficient to refer only to information that is necessary for the specification. Also, in a case where the system can be specified using information different from the PLMN-ID and ECI, the PLMN-ID and ECI may not be used in specifying the system. Note that, here, the communication apparatus 112 may determine whether a signal is from the base station that has been notified by the base station 113 in advance as a neighbor cell based on such information as the PLMN-ID and ECI. That is to say, the communication apparatus 112 may determine whether a signal has arrived from a cell which has not been registered with the base station 113 as a neighbor cell, and of which the communication apparatus 112 has not been notified as a neighbor cell. For example, in a case where the communication apparatus 112 has detected a signal of a cell that has not been registered with the base station 113 as a neighbor cell, it can analyze whether this signal is a signal of a system that is different from the wireless communication system to which the self-apparatus belongs. Furthermore, in a case where the communication apparatus 112 has detected a signal of a cell that has not been registered with the base station 113 as a neighbor cell, it may determine that this signal is a signal of a system that is different from the wireless communication system to which the self-apparatus belongs.

The communication apparatus 112 determines that a signal has arrived from a system that is different from the second wireless communication system to which the self-apparatus belongs in the foregoing manner, and transmits a UE Information indication message to the base station 113

(step S404). Here, an exemplary configuration of the UE Information Indication message is shown in FIG. 6. The UE Information Indication message includes information 601 indicating that a notification about measured information is to be provided, as well as measurement results 602 and 608 related to one or more cells. Note that in a case where, for example, the communication apparatus 112 has been instructed by the base station 113 to report the result of measurement of a surrounding environment, it can report the information 601 to the base station 113. Note that this measurement of the surrounding environment may be performed in an unconnected state (e.g., an RRC_Idle state or an RRC_Inactive state), or may be performed in a connected state (an RRC_Connected state). Note that RRC refers to radio resource control. The measurement result of each cell includes a physical cell identifier 603 of that cell, a carrier frequency 604, RSSI information 605 indicating a received signal strength indicator, radio channel information 606 used in U-Plane communication, and detected base station information 607 indicating a detected base station. Note that these are examples, and it is sufficient to include at least information related to a base station in another system that has been detected (the detected base station information 607 in FIG. 6). Other pieces of information may be options. For example, the base station 113 can be notified of the radio channel information 606 for the purpose of adjusting a radio channel used for U-Plane communication in the base station 113. Note that regarding this information, for example, the second wireless network management apparatus 111 can obtain this information by making an inquiry to the first wireless network management apparatus 101 based on the detected base station information 607, and thus the communication apparatus 112 may not provide a notification about this information. Similarly, regarding the physical cell identifier 603 and the carrier frequency 604 as well, they can be obtained by the second wireless network management apparatus 111 making an inquiry to the first wireless network management apparatus 101 based on the detected base station information 607. The RSSI information 605 can indicate, for example, the extent of interference power from the cell associated with the measurement result 602 in a case where the magnitude of RSSI indicated by this information is equal to or larger than a predetermined value, resource control for interference avoidance can be performed. On the other hand, the RSSI information 605 may be omitted in a case where resource control for interference avoidance is performed, regardless of the value of RSSI, on the condition that the communication apparatus 112 has detected a signal of another system. Note that the communication apparatus 112 may provide a notification about information of a radio channel used for U-Plane communication in the self-apparatus. In this case, this information of the radio channel can be included as an item under the radio channel information 606. In a case where the notification about the information of the radio channel used by the communication apparatus 112 is provided, this information may be stored in a different field of the UE Information Indication message, separately from the measurement results 602 and 608 related to neighbor cells. Note that as the information of the radio channel used by the communication apparatus 112 is naturally recognized by the second wireless network management apparatus 111 and the base station 113, the communication apparatus 112 may not provide the notification about this information. In this case, for example, the base station 113 may notify the second wireless network management apparatus 111 of this information of the used radio channel.

Upon receiving the UE Information Indication message, the base station 113 generates a Neighbor Cell Relations Report message and notifies the second wireless network management apparatus 111 of the same (step S405). FIG. 7 shows an exemplary configuration of the Neighbor Cell Relations Report. The Neighbor Cell Relations Report includes, for example, a first field 701 that stores parameters related to the neighbor relations of the current cell, and a second field 702 that stores information notified in step S404. The second field 702 stores information corresponding to the radio channel information 606 and the detected base station information 607.

Upon receiving the Neighbor Cell Relations Report, the second wireless network management apparatus 111 analyzes the content thereof, and determines whether information of a base station that is not under control of the self-apparatus is stored under the detected base station information 607. Then, in a case where information of a base station that is not under control of the self-apparatus is stored, the second wireless network management apparatus 111 specifies another wireless network management apparatus (wireless communication system) corresponding to that base station. Then, the second wireless network management apparatus 111 transfers the Neighbor Cell Relations Report to the address of another wireless network management apparatus. At this time, in a case where information of the address of another wireless network management apparatus has been held in advance, the second wireless network management apparatus 111 transfers the Neighbor Cell Relations Report using that address as a destination. On the other hand, in a case where information of the address of another wireless network management apparatus has not been held in advance, the second wireless network management apparatus 111, for example, makes an inquiry to the address management server 321 about information of that address. Then, the second wireless network management apparatus 111 transfers the Neighbor Cell Relations Report using the address obtained from the address management server 321 as a destination. In the example of FIG. 4, the second wireless network management apparatus 111 specifies the first wireless network management apparatus 101 based on information of the base station 103. Then, in order to transfer the Neighbor Cell Relations Report, the second wireless network management apparatus 111 makes an inquiry to the address management server 321 about the address of the first wireless network management apparatus 101 (step S406). Then, the second wireless network management apparatus 111 receives, from the address management server 321, a response regarding the address of the first wireless network management apparatus 101 (step S407). Then, the second wireless network management apparatus 111 transfers the Neighbor Cell Relations Report received in step S405 using the address obtained in step S407 as a destination (step S408). Note that in this case, the second wireless network management apparatus 111 can transmit the Neighbor Cell Relations Report with information of the base station 113, which is the transmission source of this report, included therein. In this way, information of neighbor cell relations can be shared among a plurality of wireless network management apparatuses of wireless communication systems (e.g., local 5G systems) that differ from one another.

Then, the second wireless network management apparatus 111 transmits an Update Neighbor Cell Relations message to the base station 113 to which the UE Information Indication message was transmitted by the communication apparatus 112 (step S409). Based on this message, the base station 113 transmits a UE Information Response message to the communication apparatus 112 (step S410). In accordance with the reception of this message, the communication apparatus 112 can recognize that the base station 113 treats the cell formed by the base station 103 as a neighbor cell. Also, in one example, the communication apparatus 112 can recognize that, in the subsequent communication, radio resources are adjusted between the base station 103 and the base station 113. Meanwhile, based on the Neighbor Cell Relations Report, the first wireless network management apparatus 101 specifies the base station 103 in which information of neighbor cell relations is to be updated. Then, the first wireless network management apparatus 101 transmits the Update Neighbor Cell Relations message to the specified base station 103 (step S411). In this way, the base station 103 can treat the cell formed by the base station 113 as a neighbor cell.

Next, processing executed by each apparatus will be described. FIG. 8 shows an exemplary flow of processing executed by the communication apparatus 112. Note that this processing can be realized by, for example, the CPU 201 executing a computer program stored in the ROM 208 or the like.

Upon detecting a signal, such as an announcement signal, in the aforementioned step S401 (step S801), the communication apparatus 112 determines whether this signal is a signal of the second wireless communication system to which the communication apparatus 112 itself belongs (step S802). For example, the communication apparatus 112 determines whether the PLMN-ID included in the detected signal matches the PLMN-ID of the second wireless communication system to which the self-apparatus belongs, and can determine that a signal of another wireless communication system has been detected in a case where they do not match. In a case where the communication apparatus 112 has determined that it has detected a signal of the second wireless communication system to which it belongs (YES of step S802), it executes normal processing related to this signal (step S808), and ends processing. For example, in a case where the signal is an announcement signal, the communication apparatus 112 obtains various types of parameters included in this announcement signal, and executes processing for holding (newly registering or updating) them inside the self-apparatus. Also, in a case where the signal is a paging signal, the communication apparatus 112 determines whether the self-apparatus has been called up by this paging signal, and in a case where it has been called up, it can establish connection with the base station 113 and receive user data from the base station 113.

On the other hand, in a case where the communication apparatus 112 has determined that it has detected a signal of a wireless communication system different from the second wireless communication system to which it belongs (NO of step S802), it makes preparation for notifying the base station 113 of identification information of a base station included in this signal. First, for example, the communication apparatus 112 temporarily stores the combination of the PLMN-ID and ECI included in the signal as this identification information of the base station. Also, the communication apparatus 112 sets this temporarily-stored information in a field of the detected base station information 607 of the UE Information Indication message to be transmitted to the base station 113 (step S803). Furthermore, for example, the communication apparatus 112 sets information indicating the radio channel used for U-Plane communication in the self-apparatus in a field of the radio channel information 606 of the UE Information indication message (step S804).

Then, the communication apparatus 112 transmits, to the base station 113, the UE Information Indication message in which these parameters have been set (step S805). For example, the communication apparatus 112 newly establishes connection with the base station 113 in the case of the RRC_Idle state, and restarts connection with the base station 113 and transmits this message to the base station 113 in the case of the RRC_Inactive state.

Thereafter, the communication apparatus 112 determines whether it has received a response to the UE Information Indication message (a UE Information Response message) from the base station 113 (step S806). In a case where this response has not been received (NO of step S806), the communication apparatus 112 directly ends processing. Note that the communication apparatus 112 may, for example, repeatedly execute the transmission of step S305. On the other hand, in a case where this response has been received (YES of step S806), the communication apparatus 112 deletes the identification information of the base station that was temporarily stored (step S807), and ends processing.

FIG. 9 shows an exemplary flow of processing executed by the base station 113. Note that this processing can be realized by, for example, a computer provided for the base station 113 executing a computer program stored in a storage apparatus.

Upon receiving a UE Information Indication message from the communication apparatus 112, the base station 113 extracts the radio channel information 606 and the detected base station information 607 therein, as well as other parameters shown in FIG. 6, for example. Then, based on these pieces of information, the base station 113 stores items in a parameter field (the second field 702) of a Neighbor Cell Relations Report (step S901). Then, the base station 113 transmits this Neighbor Cell Relations Report message to the second wireless network management apparatus 111 (step S902). Thereafter, the base station 113 waits for an Update Neighbor Cell Relations message from the second wireless network management apparatus 111 (step S903). Upon receiving the Update Neighbor Cell Relations message (YES of step S903), the base station 113 transmits a UE information Response message to the communication apparatus 112, and ends processing (step S904). Note that the Update Neighbor Cell Relations message can include, for example, information of the radio channel to be used for U-Plane communication with the communication apparatus 112. Based on this information, the base station 113 can set the frequency channel to be used for U-Plane communication with the communication apparatus 112 and perform communication.

FIG. 10 shows an exemplary flow of processing executed by the second wireless network management apparatus 111. Note that this processing can be realized by, for example, a computer provided for the second wireless network management apparatus 111 executing a computer program stored in a storage apparatus.

The second wireless network management apparatus 111 first receives a Neighbor Cell Relations Report message (step S1001). Then, the second wireless network management apparatus 111 determines whether this message includes information of a base station of another system different from the system to which the self-apparatus belongs (step S1002). Here, the second wireless network management apparatus ill determines, for example, whether the message includes detected base station information 607 with a PLMN-ID different from the PLMN-ID corresponding to its own system. In a case where the second wireless network management apparatus 111 has determined that information of a base station of another system is included (YES of step S1002), it subsequently determines whether it has obtained the address of another wireless network management apparatus of the system to which the base station belongs (step S1003). Here, the second wireless network management apparatus 111 can determine, for example, whether the address of another wireless network management apparatus has been held in advance. Also, for example, in a case where the address of another wireless network management apparatus has not been held or the expiration period thereof has elapsed, the second wireless network management apparatus 111 can obtain this address by transmitting an inquiry message about the same to the address management server 321. Note that this inquiry can be made by transmitting, for example, a PLMN-ID information for specifying the wireless network management apparatus which is based on identification information of the base station (the combination of the PLMN-ID and ECI), and the like to the address management server 321. Then, for example, in a case where the address has been successfully obtained from the address management server 321, the second wireless network management apparatus 111 can determine that this address has been obtained; in a case where this obtainment has failed, it can be determined that the address has not been obtained. Note that in a case where there is no address management server 21, the second wireless network management apparatus 111 may only determine whether the address of another wireless network management apparatus has been held inside the self-apparatus. Also, in this case, too, if the second wireless network management apparatus 111 has a mechanism that enables the obtainment of the address of another wireless network management apparatus, it may attempt to obtain this address with use of this mechanism and determine whether the address was actually able to be obtained.

In a case where the second wireless network management apparatus 111 has obtained information of this address (YES of step S1003), it transfers the Neighbor Cell Relations Report message to that address (step S1004). Then, the second wireless network management apparatus 111 updates Neighbor Cell Relations information in the network to which the self-apparatus belongs, and sets a status indicating a successful update (step S1005). Note that also in a case where there is no identification information of a base station outside the system to which the self-apparatus belongs (NO of step S1002), the second wireless network management apparatus 111 updates this Neighbor Cell Relations information and sets a status indicating a successful update (step S1005). Here, for example, also in a case where information of a base station in another system that was obtained in advance has been acquired again, the second wireless network management apparatus 111 may determine NO in step S1002 and proceed to step S1005 in processing. On the other hand, in a case where the information of the address was not able to be obtained (NO of step S1003), the second wireless network management apparatus 111 updates this Neighbor Cell Relations information and sets a status indicating a failed update (step S1006).

After updating the Neighbor Cell Relations information, the second wireless network management apparatus 111 transmits, to the base station 113, an Update Neighbor Cell Relations message that has been generated based on this updated information. With the Update Neighbor Cell Relations message, information of the radio channel that is intended to be used by the base station 113 for U-Plane communication is updated.

Meanwhile, another wireless network management apparatus (the first wireless network management apparatus 101) that has received the transferred Neighbor Cell Relations Report message analyzes information of this message. Then, based on the information in this message, another wireless network management apparatus updates Neighbor Cell Relations information within the wireless communication network to which the self-apparatus belongs. Note that in this case, a status indicating a successful update of the Neighbor Cell Relations information is set. Also, based on detected base station information indicated by the received Neighbor Cell Relations Report, another wireless network management apparatus specifies a base station under control which is to be adjusted in terms of the radio channel to be used for U-Plane communication. Then, another wireless network management apparatus transmits an Update Neighbor Cell Relations message to this base station specified, and updates information of the radio channel that is intended to be used by this base station for U-Plane communication.

As described above, in the present embodiment, the communication apparatus 112 notifies the base station 113 of detection of a signal of another system different from the wireless communication system to which the self-apparatus belongs. At this time, the communication apparatus 112 provides this notification with use of a UE Information Indication message, which has been prepared as a new control message. Note that this notification may be transmitted by the communication apparatus 112 using, for example, a dedicated radio resource without receiving an instruction from the base station 113, or may be transmitted by the communication apparatus 112 in response to reception of an explicit or implicit instruction from the base station 113. Also, for example, a predetermined event, such as detection of a signal of a cell different from a cell that has been notified from the base station 113 as a neighbor cell at a predetermined power level or higher, may be defined. In this case, the communication apparatus 112 can establish connection with the base station 113 and transmit a UE Information Indication message in accordance with detection of this predetermined event, irrespective of an instruction from the base station 113. Note that the communication apparatus 112 may transmit this message as a C-Plane message, or may transmit this message as U-Plane user data or in a state where this message has been multiplexed together with the user data. Note that this message may be realized by, for example, expanding information elements of a message related to Measurement reporting of the 3GPP standards, TS 37.320. Also, for example, the content of the UE Information Indication message may be transmitted via a message that is used by the communication apparatus 112 in establishing connection with the base station 113. For example, the communication apparatus 112 may include this content in a message 3 of a random-access procedure at the time of transition from the RRC_Idle state or the RRC_Inactive to the RRC_Connected state.

Also, using a Neighbor Cell Relations Report, the base station 113 notifies a wireless network management apparatus in another system of information related to the detected cell. In this way, the neighbor cell relations can be shared among a plurality of networks. Also, the second wireless network management apparatus 111 can receive an Update Neighbor Cell Relations message from the first wireless network management apparatus 101, and obtain information of the radio channel used by the base station 103 for U-Plane communication. As a result, the base station 113 can perform U-Plane communication with the communication apparatus 112 with use of a radio channel different from that of a cell in another system that is in a neighbor relation with the cell formed by the self-apparatus. Note that the base station 113 may use a radio channel that is not used by the base station 103 for communication with a communication apparatus that detected a signal of the base station 103, and may use a radio channel that is used by the base station 103 for communication with another communication apparatus. That is to say, the radio channels used by the base station 103 and the base station 113 may be determined and set in advance, or may not be set in advance, between the first wireless network management apparatus 101 and the second wireless network management apparatus 111. In a case where they are not set in advance, the base station 103 and the base station 113 can be respectively notified of pieces of information of the radio channels that are currently used by the base station 113 and the base station 103, and the radio channels that are actually used can be determined by the base station 103 and the base station 113 at their own discretion.

Note that although the above has described an example in which a UE Information Indication message is transmitted in accordance with detection of a signal of another system by the communication apparatus 112, this message may be transmitted regularly. When the result of measurement of the radio environment in the communication apparatus 112 is transmitted regularly, the base station 113 can predict whether a signal from the base station 103 interferes with downlink communication of the communication apparatus 112. That is to say, the UE Information Indication message can be used to specify whether the communication apparatus 112 is present in a position that is subject to interference by a signal from the base station 103. Then, in a case where it is predicted that the interference will occur, the base station 113 can refrain from using the radio channel used by the base station 103 during downlink communication of the communication apparatus 112. Note that a conventional Measurement Report may be used in such control. That is to say, after the neighbor cell relations have been defined on a network side, the base station 113 can notify the communication apparatus 112 of information of the cell formed by the base station 103 as neighbor cell information, and the communication apparatus 112 can execute the measurement based on this information. Then, the base station 113 can obtain the result of this measurement and execute control for assigning radio resources.

Through the above-described processing, in two neighbor cells that belong to systems that are different from each other due to, for example, relocation of a base station in a local 5G wireless communication system, it is possible to avoid the use of the same radio channel at least in an area where the cells overlap. This makes it possible to prevent the occurrence of interference in these cells, or at least suppress such interference, without an operator of a wireless communication system performing an operation.

Processing Example 2

FIG. 11 is a diagram showing an overview of a flow of processing in a second processing example. The apparatus configuration of FIG. 11 is similar to that of FIG. 3. In the present processing example, once the communication apparatus 112 has detected a radio signal, such as an announcement signal 1151, from the base station 103 in another system that has been relocated and started to operate, it makes an inquiry to the address management server 321 about the address of the first wireless network management apparatus 101 in this another system. For example, based on the PLMN-ID included in the detected radio signal and the like, the communication apparatus 112 transmits a signal 1152 for making an inquiry about the address of the first wireless network management apparatus 101 to the address management server 321 via the base station 113 and the second wireless network management apparatus 111. Then, upon receiving a response including the address from the address management server 321, the communication apparatus 112 transmits information 1153 related to the detected cell (e.g., the combination of the PLMN-ID and ECI related to that cell) to that address.

Figure 12:
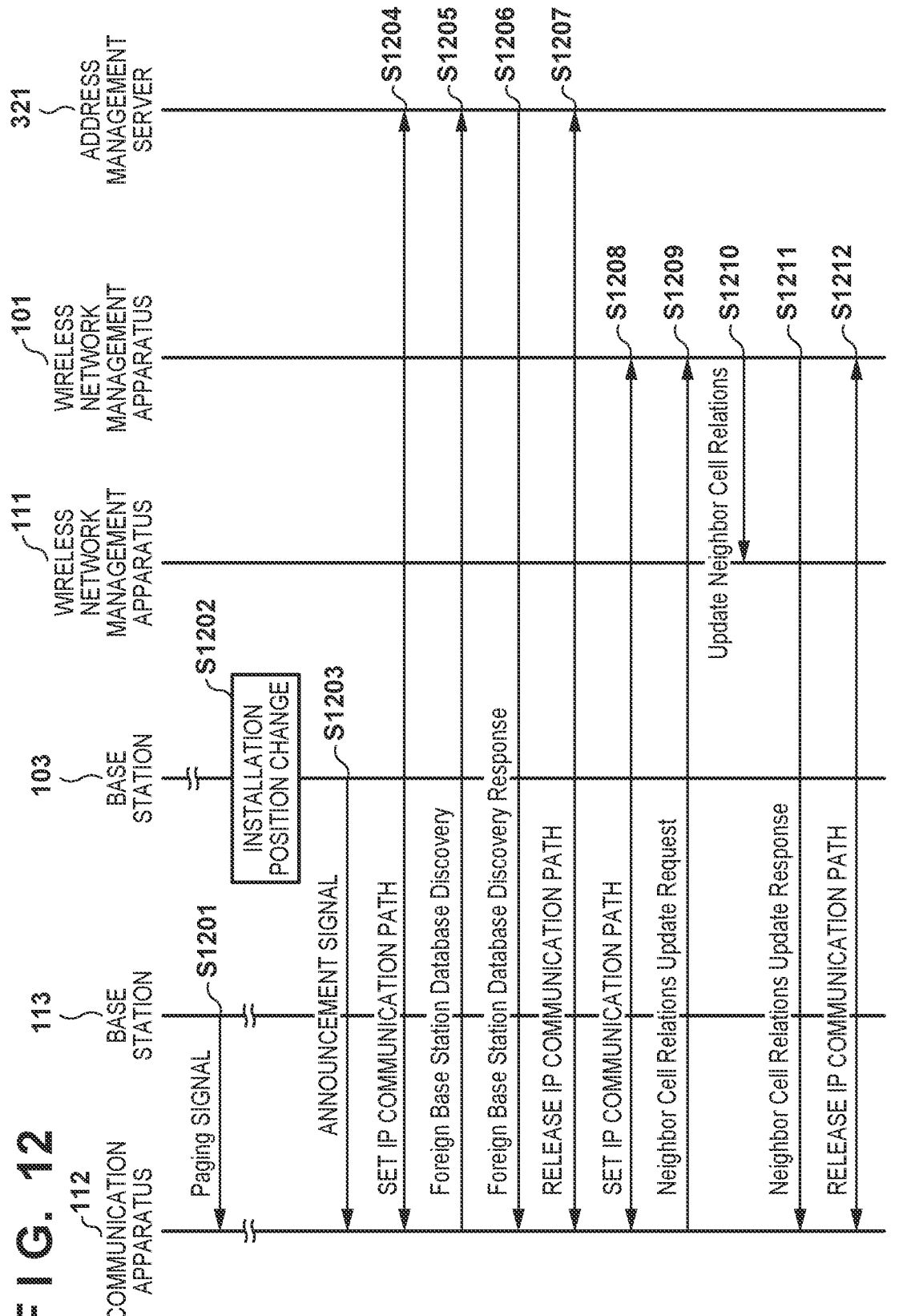
FIG. 12 is a diagram showing an exemplary flow of processing executed in the wireless communication systems.

A flow of this processing is now described using FIG. 12. The communication apparatus 112 is situated in the cell formed by the base station 113, and is in a state where it receives an announcement signal and a paging signal from the base station 113 (step S1201). Also, it is assumed that the base station 103 has been relocated as described earlier, thereby allowing radio waves to reach as far as a part of the region of the cell formed by the base station 113 (step S1202). As a result, the communication apparatus 112 detects a signal, such as an announcement signal, from the base station 103 (step S1203). The communication apparatus 112 analyzes this signal, and specifies that the signal is from the first wireless communication system different from the second wireless communication system to which the self-apparatus belongs. For example, based on the PLMN-ID included in the signal, the communication apparatus 112 specifies that it has detected a signal from the first wireless communication system different from the second wireless communication system to which the self-apparatus belongs. In this case, the communication apparatus 112 performs communication for making an inquiry to the address management server 321 about information related to the base station 103 (information of the first wireless network management apparatus 101 in the first wireless communication system). For example, the communication apparatus 112 sets an IP (Internet Protocol) communication path with the address management server 321 (step S1204), thereby enabling the execution of IP communication with the address management server 321. Then, the communication apparatus 112 transmits, to the address management server 321, a message for making an inquiry about information related to the base station 103 (a Foreign Base Station Database Discovery message) (step S1205). The Foreign Base Station Database Discovery message transmitted here incudes, for example, the combination of the PLAIN-ID and cell identifier ((e.g., ECI) related to the base station 103 as shown in FIG. 13A. Then, the communication apparatus 112 receives a response (a Foreign Base Station Database Discovery Response message) from the address management server 321 (step S1206). This Foreign Base Station Database Discovery Response message includes, for example, the address of the first wireless network management apparatus 101 associated with the base station 103 as shown in FIG. 13B. Note that this message, too, can include the combination of the PLAN-ID and cell identifier (e.g., ECI) related to the base station 103. This enables the communication apparatus 112 to clearly specify that the response has been made with respect to the inquiry in step S1205. Note that the communication apparatus 112 may issue identification information of the inquiry, transmit the message in step S1205 with this identification information included therein, and receive a response including this identification information in step S1206. In one example, after the completion of this inquiry, the communication apparatus 112 releases the IP communication path that was set in step S1204 (step S1207).

Thereafter, based on the information obtained in step S1206, he communication apparatus 112 performs communication for updating neighbor cell relations with the first wireless network management apparatus 101. For example, the communication apparatus 112 enables the execution of IP communication with the first wireless network management apparatus 101 by setting an IP communication path with the first wireless network management apparatus 101 (step S1208). Then, the communication apparatus 112 transmits, to the first wireless network management apparatus 101, a Neighbor Cell Relation Update Request message for requesting an update of neighbor cell relations (step S1209). For example, as shown in FIG. 13C, a Neighbor Cell Relation Update Request message includes information indicating the detected cell (the base station 103) and information of the radio channel that is currently used by the communication apparatus 112. Based on this information, the first wireless network management apparatus 101 can update Neighbor Cell Relations information that is under control of the self-apparatus. Also, based on this information, the first wireless network management apparatus 101 can recognize that, if the base station 103 uses the radio channel that is currently used by the communication apparatus 112, there is a possibility that interference occurs in communication of the communication apparatus 112. For this reason, for example, the first wireless network management apparatus 101 can perform processing for, for example, changing the radio channel that is intended to be used by the base station 103 for U-Plane communication. Also, the first wireless network management apparatus 101 can, for example, notify the base station 103 of information of the radio channel that is currently used by the communication apparatus 112, and prevent the base station 103 from using this radio channel in relation to a communication apparatus situated on the edge of the cell. Note that this notification can be provided via an Update Neighbor Cell Relations message. Also, the first wireless network management apparatus 101 provides the second wireless network management apparatus 101 with a notification indicating that, for example, the cells respectively formed by the base station 103 and the base station 113 are in a neighbor cell relation (step S1210). Based on this information, the second wireless network management apparatus 111 can update Neighbor Cell Relations information that is under control of the self-apparatus. Note that the first wireless network management apparatus 101 may notify the second wireless network management apparatus 111 of, for example, information indicating that the radio channel used by the base station 103 has been adjusted, and information indicating the radio channel that is intended to be used by the base station 113. Also, the first wireless network management apparatus 111 may include, for example, such information as identification information of the base station 103 and the radio channel that is currently used by the communication apparatus 112. This notification can be provided via Update Neighbor Cell Relations.

Also, the first wireless network management apparatus 101 transmits, to the communication apparatus 112, information indicating that the update of neighbor cell relations has been completed (step S1211). This information is transmitted via, for example, a Neighbor Cell Relations Update Response message. This Neighbor Cell Relations Update Response message includes a Result Code indicating whether the update has succeeded as shown in FIG. 13D, for example. Also, this message may include information of the radio channel that is currently used by the communication apparatus 112, and identification information of the base station 103. Note that, for example, identification information for identifying a Neighbor Cell Relations Update Request message may be added. In this case, the Neighbor Cell Relations Update Response message may include this identification information. In this way, the communication apparatus 112 can specify one of messages for which this message has been received in response. Once the update of neighbor cell relations has been completed through transmission/reception of the Neighbor Cell Relations Update Response message, the communication apparatus 112 releases the IP communication path with the first wireless network management apparatus 101 (step S1212).

FIG. 14 shows an exemplary flow of processing executed by the communication apparatus 112. Note that this processing can be realized by, for example, the CPU 201 executing a computer program stored in the ROM 208 or the like.

Upon detecting a signal, such as an announcement signal, in the aforementioned step S1201 (step S1401), the communication apparatus 112 determines whether this signal is a signal of the second wireless communication system to which the communication apparatus 112 itself belongs (step S1402). This processing is similar to S801 and S802 of FIG. 8. In a case where the communication apparatus 112 has determined that it has detected a signal of the second wireless communication system to which it belongs (YES of step S1402), it executes normal processing related to this signal (step S1409), and ends processing. This processing of step S1409, too, is similar to step S808 of FIG. 8. In a case where the communication apparatus 112 has determined that it has detected a signal of a system different from the second wireless communication system to which it belongs (NO of step S1402), it extracts identification information of the base station 103, which is the transmission source, from this signal and temporarily stores the same (step S1403). This identification information is, for example, the combination of a PLMN-ID and an ECI. Also, the communication apparatus 112 temporarily stores information for specifying the radio channel that is currently used by the self-apparatus (step S1404).

Then, the communication apparatus 112 makes an inquiry to the address management server 321 about the address of the first wireless network management apparatus 101 of the system to which the base station 103, which is the transmission source of the detected signal, belongs. For example, the communication apparatus 112 transmits, to the address management server 321, a Foreign Base Station Database Discovery message including the stored identification information of the base station 103 (step S1405). Note that in a case where the address management server 321 is included in the second wireless network management apparatus 111 in the wireless communication system to which the communication apparatus 112 belongs, this message is transmitted to the second wireless network management apparatus 111. Thereafter, the communication apparatus 112 waits for a response to arrive from the address management server 321 (step S1406). Based on the identification information of the base station 103, the address management server 321 searches for the address of the corresponding first wireless network management apparatus 101, and transmits a response including the result of this search to the communication apparatus 112. Here, the response can be a Foreign Base Station Database Discovery Response message, for example. In a case where this response has not been received, or in a case where the effective address of the first wireless network management apparatus 101 is not stored in the response (NO of step S1406), the communication apparatus 112 directly ends processing. On the other hand, in a case where the effective address of the first wireless network management apparatus 101 has been obtained (YES of step S1406), the communication apparatus 112 requests the first wireless network management apparatus 101 to, for example, update neighbor cell relations (step S1407). For example, the communication apparatus 112 transmits, to the first wireless network management apparatus 101, a Neighbor Cell Relations Update Request including the identification information of the base station 103 and information of the radio channel that is currently used by the communication apparatus 112. Note that the message may be transmitted with identification information of the communication apparatus 112 included therein. After this request, the communication apparatus 112 can recognize that neighbor cell relations have been updated by, for example, receiving a Neighbor Cell Relations Update Response. After transmitting the Neighbor Cell Relations Update Request, the communication apparatus 112 deletes the information that was stored in step S1403 from a storage region (step S1408), and ends processing. Note that the communication apparatus 112 can delete the information upon receiving the Neighbor Cell Relations Update Response message. Note that no limitation is intended by this, and the communication apparatus 112 may delete the information after transmitting the Neighbor Cell Relations Update Request message, without waiting for a response to be received.

Through the foregoing procedure, as the communication apparatus 112 transmits information directly to the first wireless network management apparatus 101, the first wireless network management apparatus 101 can recognize that a signal transmitted by the base station 103, which is under control thereof, can interfere with communication of the communication apparatus 112. This enables the first wireless network management apparatus 101 to, for example, perform control to change the radio channel used by the base station 103. According to this processing, in two neighbor cells belonging to systems that are different from each other, it is possible to avoid, for example, the use of the same channel. This makes it possible to prevent the occurrence of interference in these cells, or at least suppress such interference, without an operator of a wireless communication system performing an operation.

Note that in one example, after processing of FIG. 12 or FIG. 14 has been completed, the communication apparatus 112 may not repeatedly execute processing of FIG. 12 or FIG. 14 in a case where it has detected a signal from the same transmission source as the signal that was detected in that process. In this case, the communication apparatus 112 can, for example, notify the base station 113 of the result of measurement of a signal from the base station 103 as the result of measurement of a neighbor cell, while refraining from providing a notification to the first wireless network management apparatus 101. In line with this notification, the base station 113 can, for example, perform communication with the communication apparatus 112 with use of a radio channel that is not used by the base station 103 in a case where the influence of interference is significant.

Also, although the above processing example has been described in relation to an example in which both the base station 103 and the base station 113 perform control to, for example, change the radio channel to be used, no limitation is intended by this. For example, the priorities among the systems may be set. In this case, the radio channel used by a system with low priority can be changed, whereas the radio channel used by a system with high priority can remain unchanged.

Note that communication between the aforementioned communication apparatus 112 and address management server 321 or first wireless network management apparatus 101 can be performed via the base station 113. Also, this communication may be performed via the second wireless network management apparatus 111. In this case, for example, a Foreign Base Station Discovery message may be transmitted to the address management server 321 and the second wireless network management apparatus 111 as destinations. Similarly, a Neighbor Cell Relations Update Request message may be transmitted not only to the first wireless network management apparatus 101, but also to the second wireless network management apparatus 111. In this way, the second wireless network management apparatus 111 can, at the instant of reception of one of these messages, recognize that a signal from the base station 103 was detected in the communication apparatus 112. Therefore, in this case, processing of step S1210 can be skipped, for example. Note that communication between the communication apparatus 112 and the address management server 321 or the first wireless network management apparatus 101 may be performed without involvement of the base station 113. For example, there may be a case where the wireless network management apparatus 101 is situated on the cell edge of the cell formed by the base station 113 and fails to communicate with the base station 113. In this case, communication between the communication apparatus 112 and the address management server 321 or the first wireless network management apparatus 101 may be performed via, for example, another base station in the second wireless communication system, a wireless LAN, or a base station in the first Tireless communication system in some cases, among others. Information of a radio channel transmitted at this time is information of a radio channel used in a case where user data is to be communicated with the base station 113 in the second wireless communication system when a signal from the base station 103 has been detected. In this case also, similar advantageous effects can be achieved by configuring a communication path between the communication apparatus 112 and the address management server 321 or the first wireless network management apparatus 101 and transmitting/receiving information in the above-described manner.

The present invention can enable control to suppress interference among a plurality of wireless communication systems.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-187295, filed Nov. 17, 2021, which is hereby incorporated by reference herein in its entirety.

What is claimed is:

1. A communication apparatus, comprising:
one or more processors; and
one or more memories that store computer-readable instructions for causing, when executed by the one or more processors, the communication apparatus to perform a method,
wherein the method comprises:
detecting a signal transmitted from a first base station in another wireless communication system that is different from a wireless communication system which includes the communication apparatus and a second base station and in which the communication apparatus is connected to the second base station, wherein when the signal is detected, communication from the first base station to another communication apparatus in the another wireless communication system interferes with communication using a same time-frequency resource from the second base station to the communication apparatus; and
transmitting, in response to detecting the signal, information for causing the first base station to perform interference avoidance, the information including first information and second information to a management apparatus that manages communication in the another wireless communication system, the first information being related to the first base station, the second information indicating a radio channel to be used for performing communication involving user data with the second base station.

2. The communication apparatus according to claim 1, wherein
in the transmitting, the first information and the second information are transmitted to the management apparatus via the second base station.

3. The communication apparatus according to claim 2, wherein
in the transmitting, based on the detection of the signal, connection with the second base station is established irrespective of an instruction from the second base station, and the first information and the second information are transmitted to the management apparatus.

4. The communication apparatus according to claim 2, wherein
in the transmitting, in response to an instruction having been issued by the second base station, connection with the second base station is established, and the first information and the second information are transmitted to the management apparatus.

5. The communication apparatus according to claim 1, wherein
in the transmitting, the first information and the second information are transmitted to the management apparatus without involvement of the second base station.

6. The communication apparatus according to claim 1, wherein
the signal is a broadcast signal transmitted from the first base station.

7. The communication apparatus according to claim 1, wherein
the method further comprises obtaining an address of the management apparatus based on the first information, and
in the transmitting, the first information and the second information are transmitted to the address.

8. The communication apparatus according to claim 1, wherein
the wireless communication system and the another wireless communication system are configured using local 5G.

9. The communication apparatus according to claim 8, wherein
the first information includes a Public Land Mobile Network Identifier (PLMN-ID).

10. The communication apparatus according to claim 9, wherein
the first information includes a cell identifier of a cell configured by the first base station.

11. The communication apparatus according to claim 8, wherein
in the transmitting, the first information and the second information are transmitted in a control plane.

12. A management apparatus, comprising:
one or more processors; and
one or more memories that store computer-readable instructions for causing, when executed by the one or more processors, the management apparatus to perform a method,
wherein the method comprises:
managing a wireless communication system to which includes a base station and a communication apparatus;
obtaining first information from the communication apparatus that is connected to the base station in response to detecting by the communication apparatus a signal transmitted from another base station included in another wireless communication system, the first information being related to the another base station, wherein when the signal is detected by the communication apparatus, communication from the another base station to another communication apparatus in the another wireless communication system interferes with communication using a same time-frequency resource from the base station to the communication apparatus; and
transmitting information for causing the another base station to perform interference avoidance including the first information and second information to another management apparatus that manages communication in the another wireless communication system, the second information indicating a radio channel to be used for performing communication involving user data with the base station.

13. The management apparatus according to claim 12, wherein in the obtaining, the second information is obtained from the communication apparatus.

14. The management apparatus according to claim 12, wherein in the obtaining, the first information is obtained as a result of the base station transmitting, to the communication apparatus, an instruction for transmitting the first information.

15. The management apparatus according to claim 12, wherein in the obtaining, the first information is obtained as a result of establishment of connection between the communication apparatus and the base station in accordance with the detection of the signal by the communication apparatus, without the base station transmitting an instruction to the communication apparatus.

16. The management apparatus according to claim 12, wherein the method further comprises obtaining an address of the another management apparatus based on the first information, and in the transmitting, the first information and the second information are transmitted to the address.

17. The management apparatus according to claim 12, wherein the wireless communication system and the another wireless communication system are configured using local 5G.

18. The management apparatus according to claim 17, wherein the first information includes a Public Land Mobile Network Identifier (PLMN-ID).

19. The management apparatus according to claim 18, wherein the first information includes a cell identifier of a cell configured by the another base station.

20. The management apparatus according to claim 17, wherein in the transmitting, the first information and the second information are transmitted in a control plane.

21. A control method performed by a communication apparatus, the control method comprising:

detecting a signal transmitted from a first base station in another wireless communication system that is different from a wireless communication system to which includes the communication apparatus and a second base station and in which the communication apparatus is connected to the second base station, wherein when the signal is detected, communication from the first base station to another communication apparatus in the another wireless communication system interferes with communication using a same time-frequency resource from the second base station to the communication apparatus; and transmitting, in response to detecting the signal, information for causing the first base station to perform interference avoidance including first information and second information to a management apparatus that manages communication in the another wireless communication system, the first information being related to the first base station, the second information indicating a radio channel to be used for performing communication involving user data with the second base station.

22. A control method performed by a management apparatus, the control method comprising:

managing a wireless communication system which includes a base station and a communication apparatus;

obtaining first information from the communication apparatus that is connected to the base station in response to detecting by the communication apparatus a signal transmitted from another base station included in another wireless communication system, the first information being related to the another base station, wherein when the signal is detected by the communication apparatus, communication from the another base station to another communication apparatus in the another wireless communication system interferes with communication using a same time-frequency resource from the base station to the communication apparatus; and transmitting information for causing the another base station to perform interference avoidance including the first information and second information to another management apparatus that manages communication in the another wireless communication system, the second information indicating a radio channel to be used for performing communication involving user data with the base station.

23. A non-transitory computer-readable storage medium that stores a program for causing a computer included in a communication apparatus to perform a method, wherein the method comprises:

detecting a signal transmitted from a first base station in another wireless communication system that is different from a wireless communication system which includes the communication apparatus and a second base station and in which the communication apparatus is connected to the second base station, wherein when the signal is detected, communication from the first base station to another communication apparatus in the another wireless communication system interferes with communication using a same time-frequency resource from the second base station to the communication apparatus; and transmitting, in response to detecting the signal, information for causing the first base station to perform interference avoidance including first information and second information to a management apparatus that manages communication in the another wireless communication system, the first information being related to the first base station, the second information indicating a radio channel to be used for performing communication involving user data with the second base station.

24. A non-transitory computer-readable storage medium that stores a program for causing a computer included in a management apparatus to perform a method, wherein the method comprises:

managing a wireless communication system which includes a base station and a communication apparatus;

obtaining first information from the communication apparatus that is connected to the base station in response to detecting by the communication apparatus a signal transmitted from another base station included in another wireless communication system, the first information being related to the another base station, wherein when the signal is detected by the communication apparatus, communication from the another base station to another communication apparatus in the another wireless communication system interferes with communication using a same time-frequency resource from the base station to the communication apparatus; and transmitting information for causing the another base station to perform interference avoidance including the first information and second information to another management apparatus that manages communication in the another wireless communication system, the second information indicating a radio channel to be used for performing communication involving user data with the base station.

* * * * *